ABSTRACT

United States Patent [19]

Bunch

[11] 4,149,777

[45] Apr. 17, 1979

[54] RADIATION CONCENTRATING SYSTEM

[76] Inventor: Jesse C. Bunch, 816 Easley St., Silver Spring, Md. 20910

[21] Appl. No.: 811,963

[22] Filed: Jun. 30, 1977

[51] Int. Cl.² .......................................... G05D 25/00
[52] U.S. Cl. ...................................... 350/285; 353/3
[58] Field of Search ............... 350/285, 288, 289, 293; 353/3; 126/270, 271; 250/203 R

[56] References Cited

U.S. PATENT DOCUMENTS

| 1,976,428 | 10/1934 | Arthuys et al. | 353/3 |
| 3,466,119 | 9/1969 | Francia | 353/3 X |
| 4,034,735 | 7/1977 | Waldrip | 126/270 |

*Primary Examiner*—F. L. Evans
*Attorney, Agent, or Firm*—Morton J. Rosenberg

[57] ABSTRACT

A radiation concentration system for reflecting incident radiation rays from a displaceable source to a fixedly positioned focus. The concentration system includes a positioning mechanism for maintaining a mirror element plane normal to a bisecting line of an incident and a reflected angle of radiation impinging on and being reflected from the mirror plane. The radiation concentrating system provides for a displacement mechanism which drives the mirror element about mutually perpendicular axis lines. The displacement mechanism drives the mirror element about a first axis line extending in a direction from the displacement mechanism to the focus and further drives the mirror element about a second axis line normal to the first axis line. In this manner, the mirror element is maintained in a predetermined positional relation for reflection of the incident radiation to the fixed focus.

21 Claims, 8 Drawing Figures

RADIATION CONCENTRATING SYSTEM

BACKGROUND OF THE INVENTION

1. Field of the Invention

This invention relates to radiation concentrating systems. In particular, this invention relates to radiation concentrating systems for reflecting radiant energy impinging on a reflecting mechanism to a fixed focus. Still further, this invention relates to a radiation concentrating system which reflects incident radiation rays from a moveable source to a fixed focus. More in particular, this invention pertains to a radiation concentrating system which maintains a reflecting system in a plane normal to a bisecting line of an incident radiation ray to the reflecting mechanism and a reflected radiation ray from the reflecting system.

2. Prior Art

Radiation concentrating systems for reflecting incident radiation to a fixed focus is known in the art. However, in some prior art systems, the reflecting or mirror elements are fixed with relation to a base surface and thus only a small fraction of the total energy is reflected to the fixed focus point. This has the disadvantage of providing a very low energy efficient system for reflecting the radiation.

In other prior art systems, the reflecting surface for mirror elements are moveable in a single plane. This has the effect of not accounting for a large amount of radiation which impinges on the reflecting surface and is reflected out of plane with the fixed focus point. Once again, such prior art systems do not provide for a high efficiency of the incident energy to the fixed focus point from the reflecting surface.

In other prior art devices, a heliostat may be utilized for positioning each mirror element to maintain the reflected energy on the fixed focus point. However, such prior systems are generally complicated in hardware development and are extremely expensive to produce. Such prior systems do not generally provide for a simple linkage system wherein one axis is fixedly maintained in a directed position from the radiation concentrating system to the fixed focus point and further rotation about a second axis line normal or perpendicular to the first axis line.

SUMMARY OF THE INVENTION

Radiation concentration system for reflecting incident radiation from a displaceable source to a fixedly positioned focus. The radiation concentration system includes a reflection mechanism. A universal displacement mechanism is coupled to the reflection mechanism about a first axis line extending in a direction from the universal displacement mechanism to the fixed focus. Additionally, the reflection mechanism is rotationally actuated about a second axis line normal to the first axis line wherein the reflection mechanism is maintained in a predetermined positional relation for reflection of the incident radiation to the fixed focus.

DESCRIPTION OF THE PREFERRED EMBODIMENTS

Figure 1:
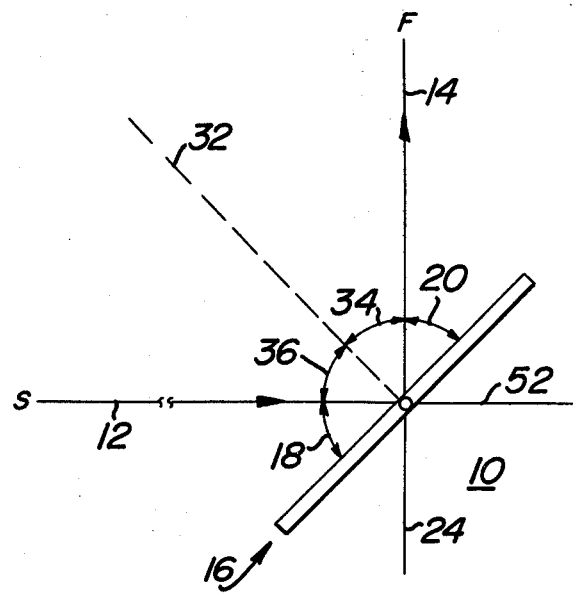
FIG. 1 is a schematic diagram showing the positional relations of the source, the radiation concentration system, and the fixed focus.

Referring now to FIGS. 1-7, there is shown radiation concentrating system 10 for reflecting incident radiation rays 12 from displaceable source S to a fixedly positioned focus F. As can be seen in the schematic diagram of FIG. 1, incident radiation rays 12 impinge on reflection mechanism 16 forming incident complement angle 18. Incident radiation 12 is reflected from reflection mechanism 16 at complement reflection angle 20 equal to the incident complement angle 18 and produces reflected radiation rays 14.

Figure 2:
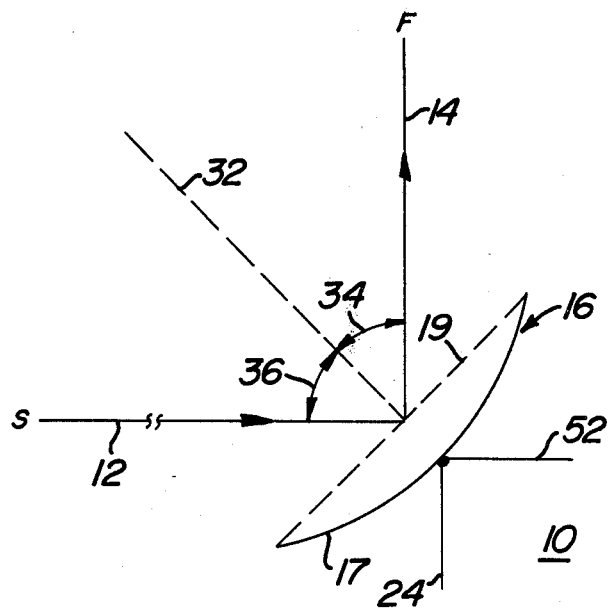
FIG. 2 is a schematic diagram showing the positional relationship of the source, the fixed focus, and the radiation concentration system having a non-planar reflection mechanism.

For purposes of ease of description, reflecting mechanism 16 will hereinafter be discussed in terms of planar elements. However, it is to be understood that reflection mechanism 16 may include curvilinear reflecting surface 17 as shown in FIG. 2. In this type surface configuration, the average incident and reflected rays 12 and 14 appear to be optically reflected from virtual plane 19. It is obvious that virtual plane 19 degenerates to the surface contour plane when reflecting mechanism 16 is planar in contour.

Universal displacement mechanism 22 is coupled to reflection mechanism 16 in a manner such that reflection mechanism 16 is driven in a predetermined contour for maintaining reflected radiation 14 in a directed path to fixed focus F responsive to the displacement of source S. As will be seen in following paragraphs, reflection mechanism 16 is rotationally actuated about first axis line 24 in a controlled rotation defined by directional rotational arrow 26. It will be noted that the mechanism defining first axis line 24 extends in a direction from universal displacement mechanism 22 passing through second axis line 28 to focus F. First axis line 24 is maintained in this direction throughout the operation of radiation concentrating system 10 irrespective of the displacement of source S. Additionally, universal displacement mechanism 22 rotationally actuates reflection mechanism 16 about second axis line 28 shown in FIG. 2 as defined by directional rotational arrow 30. Second axis line 28 is normal to first axis line 24 and by cooperative displacement of the mechanisms to be detailed in following paragraphs maintains reflection mechanism 16 is predetermined positional relation for reflection of incident radiation 12 to fixed focus F.

Universal displacement mechanism 22 includes positioning mechanism 38 for maintaining virtual plane 19 of reflection mechanism 16 normal to bisecting line 32 of incident angle 36 and reflection angle 34 of the radiation rays 12 and 14 incident to and reflected from reflection mechanism 16. In overall concept, the function and purpose of radiation concentration system 10 is to bisect the incident and reflected angles 34 and 36 as a function of, and responsive to the displacement of source S. In this manner, reflected radiation rays 14 are maintained in a predetermined linear path contour for impingement at all times on focus F which is fixed with respect to ground or some other base surface. As has hereinbefore been described, when reflecting mechanism 16 includes a planar reflecting element, virtual plane 19 becomes the planar reflecting surface.

Figure 3:
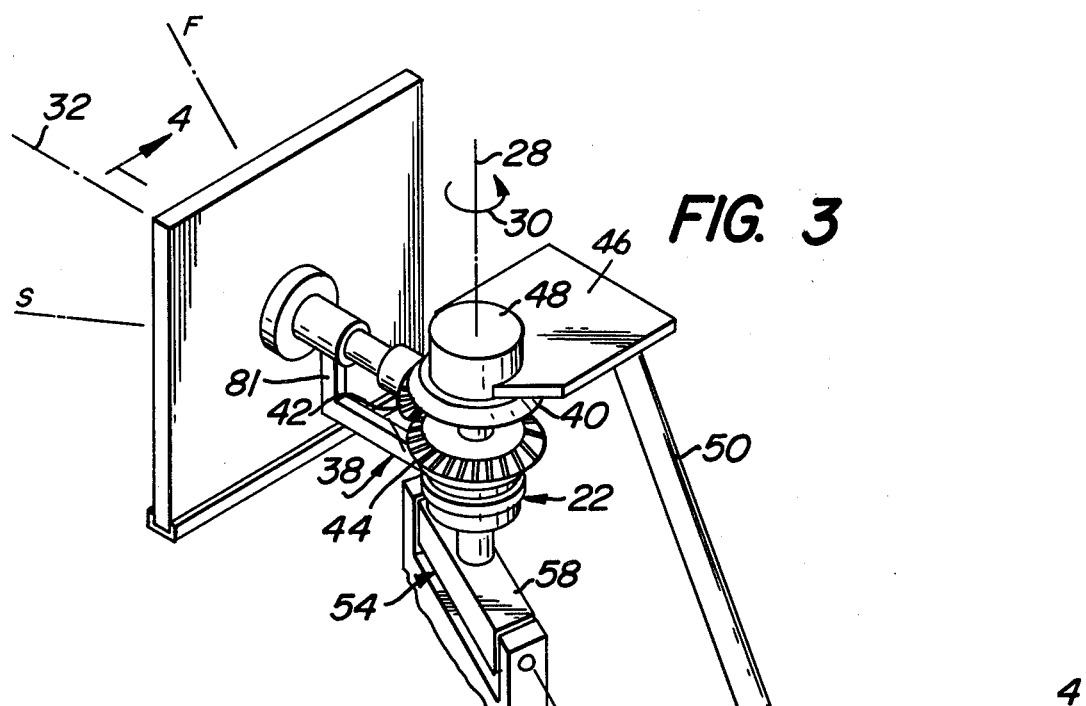
FIG. 3 is an isometric view of the radiation concentration system.
Figure 4:
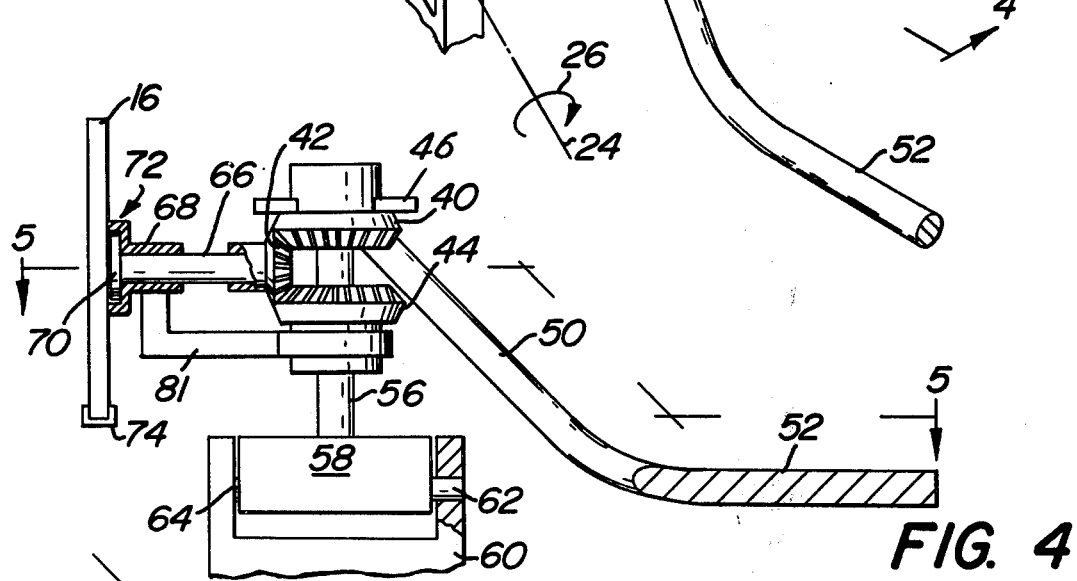
FIG. 4 is a sectional elevation view of the radiation concentration system taken along the section line 4—4 of FIG. 3.
Figure 5:
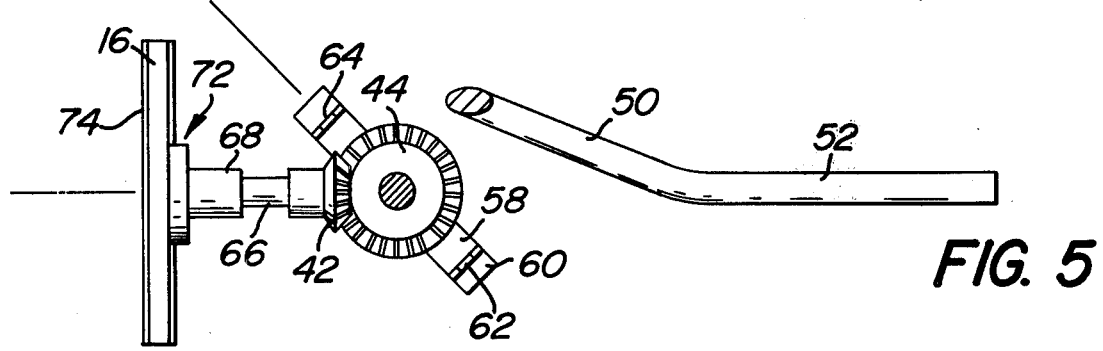
FIG. 5 is a sectional view of the radiation concentration system taken along the section line 5—5 of FIG. 4.

Referring now to FIGS. 3-5, there is shown one embodiment for universal displacement mechanism 22. Positioning mechanism 38 includes first bevel gear 40 rotationally actuatable about second axis line 28 in a direction defined by rotational arrow 30. Intermediate bevel gear 42 matingly engages first bevel gear 40 and is rotationally actuatable about bisecting line 32. For ease of drawing description, it is seen that first bevel gear 40 and intermediate bevel gear 42 form a right angle drive train, however, the angle of engagement of gears 40 and 42 are not important to the inventive concept as is herein described. Third bevel gear 44 matingly engages intermediate gear 42 and is rotationally actuatable around second axis line 28 in direction 30. It will be understood that third bevel gear 44 is fixedly secured when taken with respect to any rotational displacement around second axis line 28. Thus, intermediate bevel gear 42 is rotationally engaged to first and third bevel gear members 40 and 44 respectively.

Both first and third bevel gears 40 and 44, have the same gear radius and thus angles 34 and 36 may be bisected by bisecting line 32 responsive to displacement of source S in a planar manner. This bisection of included angles 34 and 36 in summation permits maintenance of the path of reflected rays 14 onto fixed focus F during planar displacement of source S.

Maintenance of reflection mechanism 16 in a plane normal to bisecting line 32 is provided by actuating arm 50 which is rigidly secured to first bevel gear 40 for rotationally actuating first bevel gear 40 in order to drive intermediate bevel gear 42 in the rotational contour hereinbefore described. First bevel gear 40 is bolted or otherwise fixedly fastened to platform lug 48 extending from a top surface of gear 40. Extending at a right angle to platform lug 48 is actuating platform 46 which is rigidly secured to lug 48. Actuating arm 50 is secured to a lower surface of platform 46 and extends in a downwardly skewed manner shown in FIGS. 3-5. Actuating arm 50 extends through extended length section 52 which is maintained in direction determined by source S. Section 52 is extended and lies coincident with incident radiation rays 12 from source S at all times throughout the displacement of reflection mechanism 16. Section 52 may be driven by a heliostat mechanism or some other device, not part of the instant invention, which maintains section 52 pointed at all times to source S throughout the displacement. The schematic representation of section 52 is shown in FIG. 1. Thus, movement of actuating arm 50 by appropriate displacement of section length 52 causes rotation of platform 46 and lug 48 which in turn is fixedly secured and rotationally drives first bevel gear 40.

It is to be understood that although it has been stated that section 52 is directed toward source S at all times in the displacement operation, such criteria is provided for ease of mechanism fabrication. In reality, the only criteria is that there exist on section 52, a displacement point which is always maintained in a line passing through second axis line 28 and source S. It is to be understood that from an optimizing engineering consideration, the displacement point on section 52 may be advantageously in a colinear manner with the intersection point of axes lines 28, 24 and source S.

In order to achieve bisection of angles 34 and 36 when source S is displaced in a plurality of planes, univeral displacement mechanism 22 includes journal mechanism 54 which is secured to third bevel gear 44 for rotation of third bevel gear 44 about first axis line 24. Third bevel gear 44 is secured to bevel shaft 56 extending from journal rotational member 58 to first bevel gear 40 as is shown in FIG. 4. Rotational member 58 is mounted to journal housing 16 on opposing ends through journal bearings 62 and 64. In this manner, universal displacement mechanism 22 is rotationally actuatable about first axis line 24 as is shown in FIG. 3. Thus, with both journal 54 and positioning mechanism 38 in operable movement, it is seen that universal displacement mechanism 22 is moveable about second axis line 28 and first axis line 24. By maintaining extended length section 52, or a point thereon, of actuating arm 50 in a linear coincident direction pointed toward source S through axis line 28, reflection mechanism 16 may be maintained in a plane normal to bisecting line 32 to permit maintenance of reflecting rays 14 being incident on focus F as a function and responsive to the displacement of source S in a predetermined motion thereof.

Thus, it is seen that actuating arm 50 and extended length section 52 provides a mechanism for displacing reflection mechanism 16 responsive to a linear displacement line maintained coincident and extending through universal mechanism 22 and source S. As seen in FIGS. 3-5, the linear displacement line is defined by the contour line of extended length section 52 which when extrapolated passes through second axis line 28 and displaceable source S.

Actuating arm member 50 is rotationally mounted about second axis line 28 and may be contoured in a manner such that extension section 52 extends coincident with the now defined linear displacement line. In this manner, and importantly to the overall concept of system 10, there is provided a non-complex actuation of reflection mechanism 16 for purposes of maintaining reflected rays positionally directed to fixed focus F.

Reflection mechanism 16 may be a mirror element and may be formed in planar contour as is shown in FIGS. 3-5. It is to be understood that if reflection mechanism 16 were rigidly secured to intermediate bevel gear 42, that reflection mechanism or mirror element 16 would rotate about bisecting line 32 as actuating arm 50 were displaced in accordance with the predetermined path of source S. In order to maintain mirror element 16 from rotating about bisecting line 32, a number of mechanisms may be introduced, one of which is shown in FIGS. 3-5. In this embodiment, intermediate bevel gear 42 is rotationally mounted to reflection mechanism 16. As shown clearly in FIG. 4, bevel shaft member 66 extending in the direction determined by the extension of bisecting line 32, is secured on one end to intermediate bevel gear 42. Bevel shaft member 66 extends into housing 68 rigidly secured to a back surface of reflection mechanism 16. Additionally, bevel shaft member end 70 is maintained within housing 68 to form shaft bearing device 72 which is as seen secured to reflection mechanism 16. In this manner, bevel shaft member 66 is rotationally displaceable within shaft bearing device 72 and allows rotation of shaft member 66 while simultaneously maintaining mirror or reflection mechanism 16 in a relatively independently fixed position. Mirror weight 74 may be fixedly attached to a lower surface of reflection mechanism 16 as is shown in FIGS. 3-5 to additionally provide means whereby reflection mechanism 16 will not rotate as a function of the rotation of right angle bevel gear 42 and the responsive rotation of bevel shaft member 66.

In order to maintain intermediate gear 42 in engaged relation with gears 40 and 44, slip ring housing member 81 may be rotationally secured to shaft 56 and housing 68. Other types of securing devices may be utilized, however such is not important to the inventive concept as is herein described.

In this manner, a plurality of heliostat units or one heliostat unit may be connected to a plurality of actuating arm extended length sections 52 to provide concentrated reflected radiation to a fixed focus F responsive to source S displacement.

Figure 6:
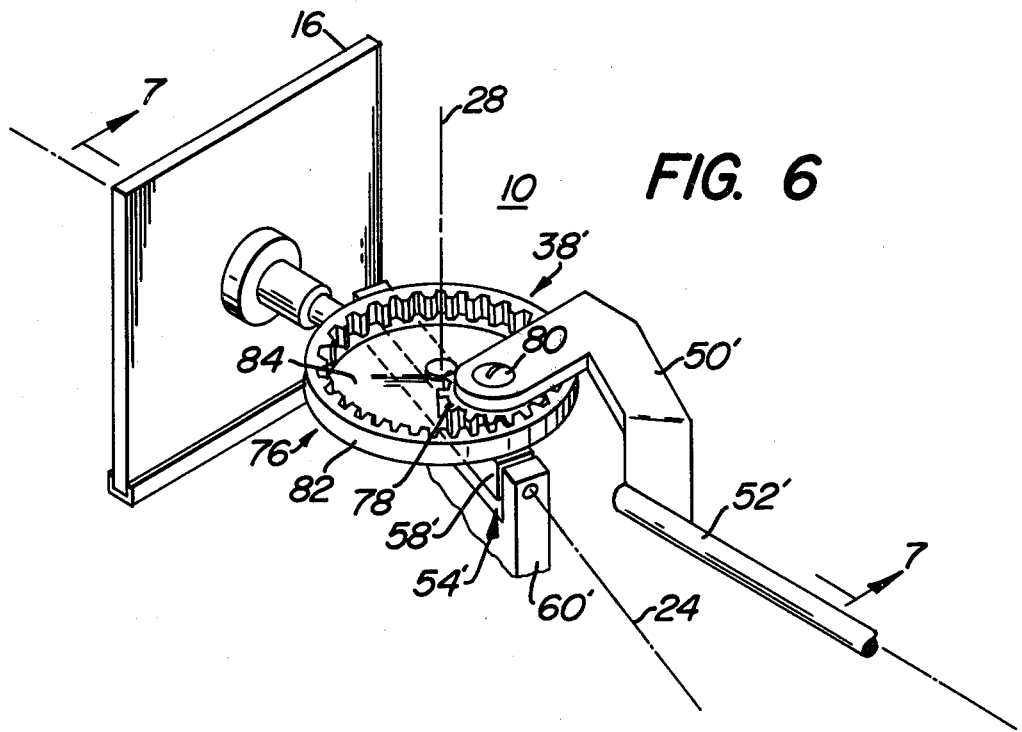
FIG. 6 is an isometric view of an embodiment of the radiation concentration system.
Figure 7:
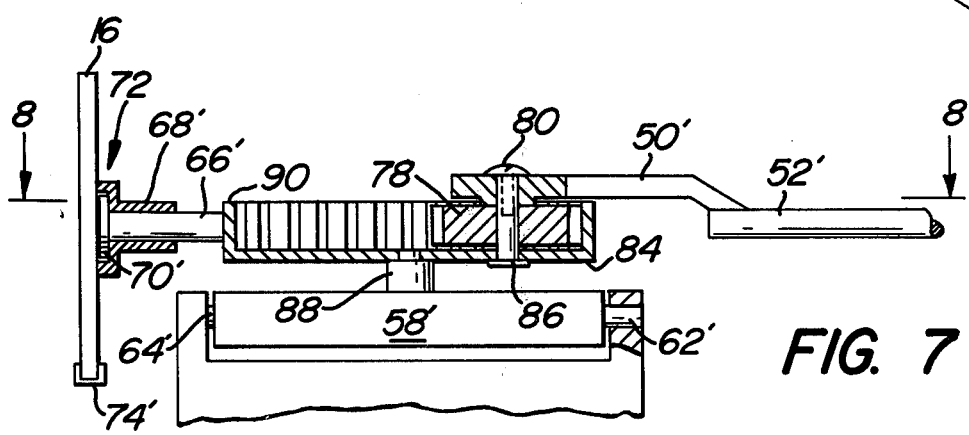
FIG. 7 is a section elevational view of the embodiment of the radiation concentration system taken along the section line 7—7 of FIG. 6; and, FIG. 8 is a sectional view of the embodiment of the radiation concentration system taken along the section line 8—8 of FIG. 7.
Figure 8:
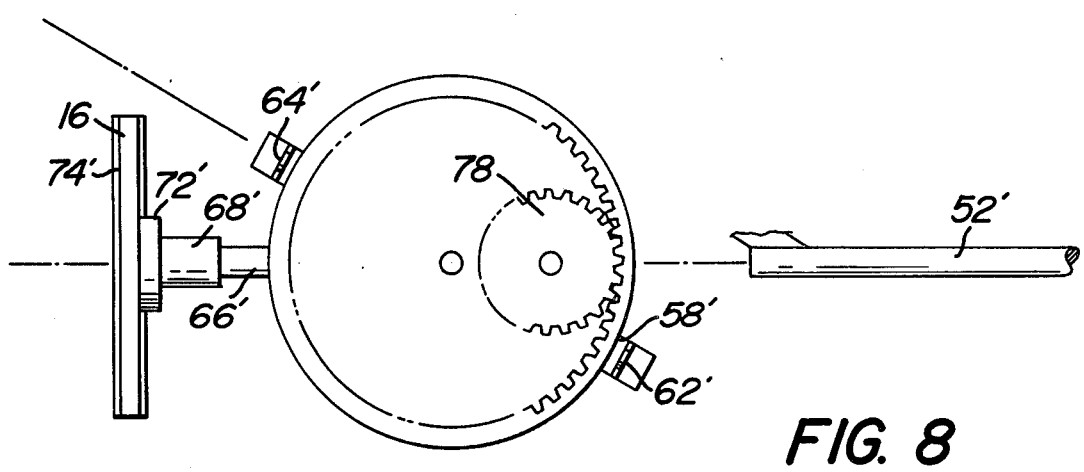

Referring now to FIGS. 6-8 there is shown another embodiment of radiation concentrating system 10 for positioning reflection mechanism 16 in a plane normal to bisecting line 32 of incident angle 18 and reflected angle 20 of impinging radiation 12 from source S. In the embodiment shown in FIG. 6, journal mechanism 54' is maintained in fixed position having an extended length in the direction of first axis line 24 as was the case in the embodiment shown in FIGS. 3-5. The method of rotating reflection mechanism 16 in a plane substantially normal to second axis line 28 is provided by positioning mechanism 38'. Positioning mechanism 38' includes actuating arm 50' which is displaceable responsive to the movement of source S. Additionally, actuating arm 50' is secured in fixed relation to actuating arm extended length section 52' which is maintained in a directed linear fashion along incident rays 12 and is maintained coincident with source S through axis line 28 throughout the displacement of reflection mechanism 16.

Positioning mechanism 38' further includes gearing mechanism 76 which is secured to actuating arm member 50' and reflection mechanism 16. Gearing mechanism 76 includes spur gear 78 which is fixedly secured to actuating arm member 50' through gear bolt or nut member 80. Additionally, the radius of spur gear 78 is substantially equal to one-half the radius of internal spur gear 82 for bisection of angles 34 and 36. Internal spur gear 82 is rotational about second axis line 28 responsive to rotation of actuating arm member 50'. Thus, rotation of actuating arm member 50' causes a rotation of spur gear 78 which drives internal spur gear 82 responsively. Internal spur gear 82 includes base section 84 serving as a lower continuous surface for gear 82. Bolt member 80 passes through base section 84 having a rivet like member 86 extending from a lower surface of base 84 and being rotational therewith. Thus, spur gear 78 is rotationally maintained in contact with internal spur gear 82. Additionally, journal mechanism 54' is rotationally secured to internal spur gear 82 through journal bearing member 88 passing through base section 84.

Extending outward from internal spur gear 82 sidewall member 90 is bevel shaft member 66'. Bevel shaft member 66' includes an enlarged bevel shaft end member 70' inserted within housing 68' to form shaft bearing device 72'. Shaft 66' is free to rotate with respect to housing 68' or vice-versa in order to maintain mirror or reflecting mechanism 16 in a fixed rotational position independent of the rotation of radiation concentrating system 10 about first axis line 24. As was the case in the first embodiment discussed, reflecting mechanism 16 includes mirror weight 74' for aiding in the maintenance of the angular positioning of mirror 16.

Journal mechanism 54' includes journal rotation member 58' which has an extended length in the direction of first axis line 24. Journal housing 60' is fixedly secured to a base or ground surface and journal rotation member 58' is rotationally coupled to journal housing 60' about first axis line 24. Journal rotation member 58' includes journal bearings 62' and 64' on opposing ends of the extended length and insertable within a recess formed in housing 60' to permit rotation of both journal rotation member 58' and positioning mechanism 38' around or about first axis line 24.

In overall concept, radiation concentration system 10 for reflecting incident radiation from displaceable source S to focus F includes reflection mechanism 16 in combination with universal displacement mechanism 22. Mechanism 22 in all embodiments must be coupled to reflection mechanism 22, however it is to be understood that universal displacement mechanism 22 may be in some instances physically displaceable from reflection mechanism 16. Universal displacement mechanism 22 is displaceably actuated responsive to a first linear line extending from mechanism 22 to displaceable source S. Displacement of universal displacement mechanism 22 actuates bisecting line 32 between the first linear line and second linear line or first axis line 24 extending from universal displacement mechanism 22 to focus F. Universal displacement mechanism 22 is rotationally actuatable about second linear line or first axis line 24 and provides for displacing reflection mechanism 16 responsive to bisecting line 32 displacement. In this way, universal displacement mechanism 22 is rotatably actuatable about first axis line 24 and second axis line 28 lying normal to second linear line or first axis line 24. As can be seen, second axis line 28 extends normal to a plane defined by the first and second linear lines as has been hereinbefore described.

As is to be understood, each radiation concentrating system 10 may be driven in an independent mode or in combination with a plurality or a multiplicity of other systems 10. Thus, it is to be taken within the scope of the inventive concept that a multiplicity of reflection mechanisms 16 may be driven by one or more universal displacement mechanism 22 acting independent or through kinematic linkage mechanisms.

Journal mechanism 54' includes journal rotation member 58' which has an extended length in the direction of first axis line 24. Journal housing 60' is fixedly secured to a base or ground surface and journal rotation member 58' is rotationally coupled to journal housing 60' about first axis line 24. Journal rotation member 58' includes journal bearings 62' and 64' on opposing ends of the extended length and insertable within a recess formed in housing 60' to permit rotation of both journal rotation member 58' and positioning mechanism 38' around or about first axis line 24.

Although this invention has been described in connection with specific forms and embodiments thereof, it will be appreciated that various modifications other than those discussed above may be resorted to without departing from the spirit or the scope of the invention. For example, equivalent elements may be substituted for those specifically shown and described, certain features may be used independently of other features, and in certain cases particular locations of elements may be reversed or interposed, all without departing from the spirit or scope of the invention as defined in the appended claims.

What is claimed is:

1. A radiation concentration system for reflecting incident radiation from a displaceable source to a fixedly positioned focus, comprising:
   (a) reflection means;
   (b) universal displacement means coupled to said reflection means for (1) rotationally actuating said reflection means about a first axis line extending in a direction from said universal displacement means to said focus, and (2) rotationally actuating said reflection means about a second axis line normal said first axis line, said rotational actuations for maintaining said reflection means in predetermined positional relation for reflection of said incident radiation to said fixed focus; and,
   (c) means for displacing said reflection means coupled to said universal displacement means, said displacement means including an actuating arm member extending in a predetermined direction defining a linear displacement line, said reflection means being displaced responsive to said linear displacement line being maintained in a direction substantially coincident and extending between said universal displacement means and said displaceable source.

2. The radiation concentration system as recited in claim 1 where said universal displacement means includes means for positioning a virtual plane of said reflection means normal to a bisecting line of the sum of an incident and a reflected angle of radiation of said reflection means.

3. The radiation concentration system as recited in claim 1 where said linear displacement line extends between said second axis line and said displaceable source.

4. The radiation concentration system as recited in claim 3 where said actuating arm member is rotationally mounted about said second axis line.

5. The radiation concentration system as recited in claim 3 where said means for positioning said reflection means includes:
   (a) a first bevel gear member rotationally actuatable about said second axis line;
   (b) an intermediate bevel gear member engaged to said first bevel gear member; and,
   (c) a third bevel gear member engaged to said intermediate bevel gear member having an axis line coincident with said second axis line.

6. The radiation concentration system as recited in claim 5 where said intermediate bevel gear is rotationally engaged to said first and third bevel gear members.

7. The radiation concentration system as recited in claim 5 where said first bevel gear member is rigidly secured to said actuating arm member for rotationally actuating said first bevel gear member.

8. The radiation concentration system as recited in claim 7 where said actuating arm member includes an extended length element positionally maintained in a direction coincident along a linear path to said source.

9. The radiation concentration system as recited in claim 5 where said intermediate bevel gear is rotationally mounted to said reflection means.

10. The radiation concentration system as recited in claim 9 including:
    (a) a bevel shaft member secured to said intermediate bevel gear; and,
    (b) shaft bearing means secured to said reflection means, said bevel shaft member being rotationally displaceable within said shaft bearing means.

11. The radiation concentration system as recited in claim 10 including weight means secured to said reflection means for fixedly positioning said reflection means independent of said rotating bevel shaft member.

12. The radiation concentration system as recited in claim 5 where said universal displacement means includes journal means secured to said third bevel gear member for rotation of said third bevel gear member about said first axis line.

13. The radiation concentration system as recited in claim 1 where said means for positioning said reflection means includes:
    (a) said actuating arm member displaceable responsive to movement of said source; and,
    (b) gear means secured to said actuating arm member and said reflection means.

14. The radiation concentration system as recited in claim 13 where said gear means includes:
    (a) a spur gear member secured to said actuating arm member; and,
    (b) an internal spur gear member matingly engaged to said spur gear member, said internal spur gear member being rotational about said second axis line, said spur gear being rotationally mounted to said internal spur gear member.

15. The radiation concentration system as recited in claim 14 including journal means rotationally secured to said internal spur gear member for rotation of said gear means about said first axis line.

16. The radiation concentration system as recited in claim 15 where said journal means includes:
    (a) a journal rotation member having an extended length in a direction of said first axis line; and,
    (b) a journal housing being fixedly secured to a base surface, said journal rotation member being rotationally coupled to said journal housing about said first axis line.

17. The radiation concentration system as recited in claim 16 where said internal gear member is rotationally mounted to said reflection means.

18. The radiation concentration system as recited in claim 17 including:
    (a) an internal gear shaft member secured to said internal gear; and,
    (b) shaft bearing means secured to said reflection means, said shaft member being rotationally displaceable within said shaft bearing means.

19. A radiation concentration system for reflecting incident radiation from a displaceable source to a fixedly positioned focus, comprising:
    (a) reflection means;
    (b) universal displacement means coupled to said reflection means, said universal displacement means being displaceably actuated responsive to a first linear line extending from said universal displacement means to said displaceable source, said universal displacement means actuating a bisecting line between said first linear line and a second linear line extending from said universal displacement means to said focus, said universal displacement means being rotationally actuatable about said second linear line; and,
    (c) displacement means coupled to said universal displacement means, said displacement means having an actuating arm member extending in a predetermined direction for displacing said reflection means responsive to said bisecting line displacement.

20. The radiation concentration system as recited in claim 19 where said universal displacement means is rotationally actuatable about a second axis line normal said second linear line.

21. The radiation concentration system as recited in claim 20 where said second axis line extends normal to a plane defined by said first and second linear lines.

* * * * *